US012657779B2

(12) United States Patent
Liang et al.

(10) Patent No.: US 12,657,779 B2
(45) Date of Patent: Jun. 16, 2026

(54) DATA PROCESSING METHOD AND APPARATUS, ELECTRONIC DEVICE, AND STORAGE MEDIUM

(71) Applicants: ZTE Corporation, Shenzhen (CN); SUN YAT-SEN UNIVERSITY, Guangzhou (CN)

(72) Inventors: Fan Liang, Shenzhen (CN); Gui Xu, Shenzhen (CN); Zhao Wu, Shenzhen (CN); Ping Wu, Shenzhen (CN); Pinlong Cai, Shenzhen (CN); Shaowei Xie, Shenzhen (CN); Ying Gao, Shenzhen (CN)

(73) Assignees: ZTE Corporation, Shenzhen (CN); SUN YAT-SEN UNIVERSITY, Guangzhou (CN)

( * ) Notice: Subject to any disclaimer, the term of this patent is extended or adjusted under 35 U.S.C. 154(b) by 306 days.

(21) Appl. No.: 18/570,629

(22) PCT Filed: May 26, 2022

(86) PCT No.: PCT/CN2022/095290
§ 371 (c)(1),
(2) Date: Dec. 14, 2023

(87) PCT Pub. No.: WO2022/262546
PCT Pub. Date: Dec. 22, 2022

(65) Prior Publication Data
US 2024/0289993 A1 Aug. 29, 2024

(30) Foreign Application Priority Data
Jun. 15, 2021 (CN) .......................... 202110662694.5

(51) Int. Cl.
*G06T 9/00* (2006.01)

(52) U.S. Cl.
CPC .............. *G06T 9/001* (2013.01); *G06T 9/002* (2013.01)

(58) Field of Classification Search
None
See application file for complete search history.

(56) References Cited

U.S. PATENT DOCUMENTS 11,451,802 B2 * 9/2022 Yea ........................ H04N 19/44
11,483,363 B2 * 10/2022 Hur ........................ H04L 65/762
(Continued)

FOREIGN PATENT DOCUMENTS

CN 110418135 A 11/2019
CN 111145090 A 5/2020
(Continued)

OTHER PUBLICATIONS

International Search Report and Written Opinion for International Application No. PCT/CN2022/095290, mailed Aug. 5, 2022.

*Primary Examiner* — Anand P Bhatnagar
(74) *Attorney, Agent, or Firm* — Wolf, Greenfield & Sacks, P.C.

(57) ABSTRACT

A data processing method and apparatus, an electronic device, and a storage medium are disclosed. The method may include determining a prediction table corresponding to attribute information of a point cloud; determining, a residual according to the prediction table; and encoding the residual and the index of the predicted value to form a code stream for transmission or storage.

20 Claims, 8 Drawing Sheets

(56)        References Cited

U.S. PATENT DOCUMENTS

| | | | | |
|---|---|---|---|---|
| 11,704,840 | B2 * | 7/2023 | Wan | H04N 19/593 |
| | | | | 382/232 |
| 11,889,114 | B2 * | 1/2024 | Iguchi | H04N 19/184 |
| 11,956,470 | B2 * | 4/2024 | Ray | H04N 23/698 |
| 12,205,332 | B2 * | 1/2025 | Oh | G06T 17/00 |
| 12,301,872 | B2 * | 5/2025 | Oh | H04N 19/597 |
| 12,413,763 | B2 * | 9/2025 | Hur | G06T 9/001 |
| 2021/0006797 | A1 | 1/2021 | Kathariya et al. | |
| 2021/0314616 | A1 * | 10/2021 | Ray | H04N 19/70 |
| 2021/0329270 | A1 * | 10/2021 | Yea | H04N 19/172 |
| 2021/0409769 | A1 * | 12/2021 | Iguchi | G06T 9/004 |
| 2024/0114167 | A1 * | 4/2024 | Iguchi | G06T 9/004 |
| 2024/0298029 | A1 * | 9/2024 | Oh | H04N 19/42 |

FOREIGN PATENT DOCUMENTS

| | | | |
|---|---|---|---|
| CN | 111405281 | A | 7/2020 |
| CN | 112565734 | A | 3/2021 |
| WO | WO 2021/003726 | A1 | 1/2021 |

* cited by examiner

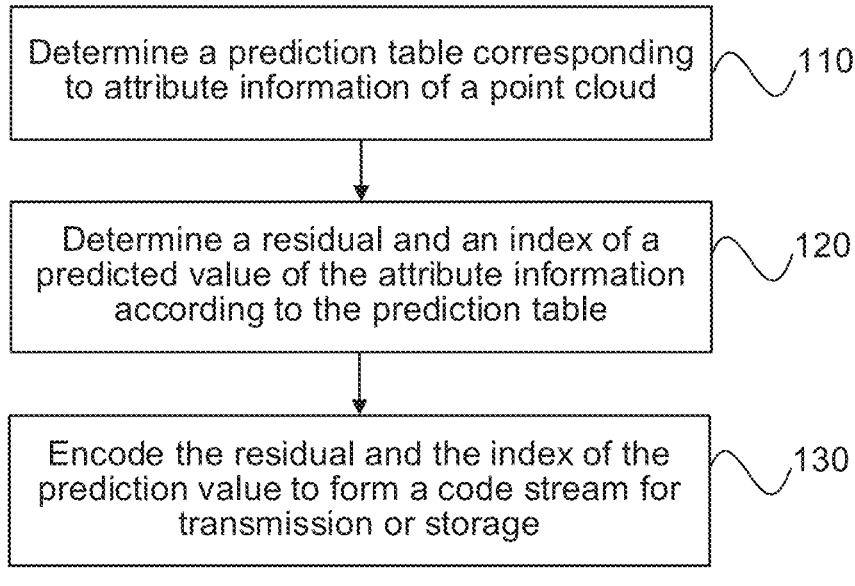

Determine a prediction table corresponding to attribute information of a point cloud ~110

Determine a residual and an index of a predicted value of the attribute information according to the prediction table ~120

Encode the residual and the index of the prediction value to form a code stream for transmission or storage ~130

FIG. 1

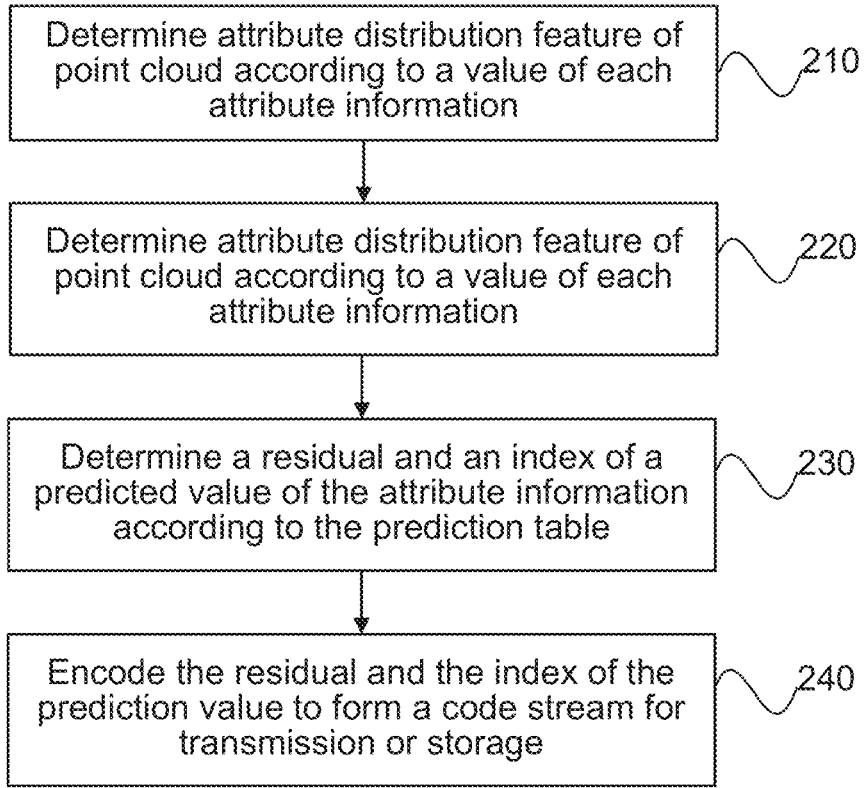

Determine attribute distribution feature of point cloud according to a value of each attribute information ~210

Determine attribute distribution feature of point cloud according to a value of each attribute information ~220

Determine a residual and an index of a predicted value of the attribute information according to the prediction table ~230

Encode the residual and the index of the prediction value to form a code stream for transmission or storage ~240

FIG. 2

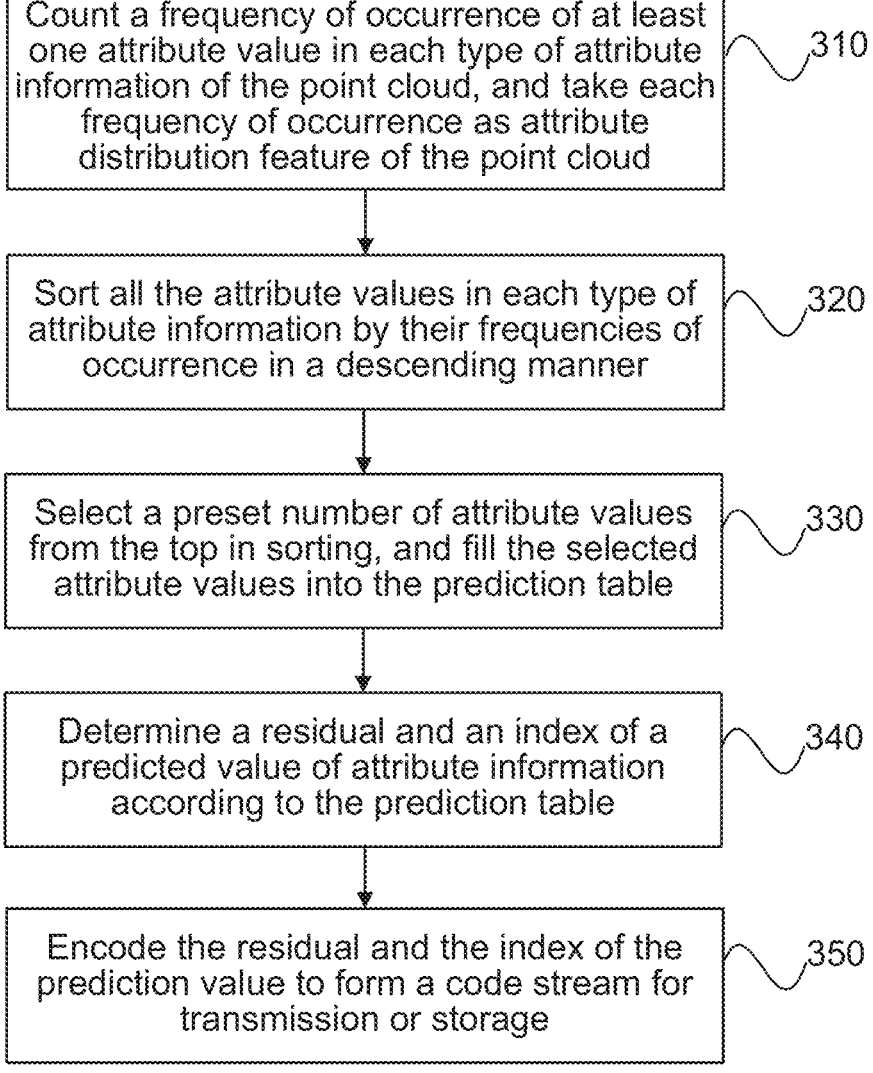

Count a frequency of occurrence of at least one attribute value in each type of attribute information of the point cloud, and take each frequency of occurrence as attribute distribution feature of the point cloud — 310

Sort all the attribute values in each type of attribute information by their frequencies of occurrence in a descending manner — 320

Select a preset number of attribute values from the top in sorting, and fill the selected attribute values into the prediction table — 330

Determine a residual and an index of a predicted value of attribute information according to the prediction table — 340

Encode the residual and the index of the prediction value to form a code stream for transmission or storage — 350

FIG. 3

Count a frequency of occurrence of attribute information ⟞⟍⟍⟋101

Select attribute information with some frequencies of occurrence to generate a prediction table ⟞⟍⟍⟋102

Select a predicted value from the prediction table and generate a residual ⟞⟍⟍⟋103

Encode the residual and the index of the predicted value ⟞⟍⟍⟋104

DATA PROCESSING METHOD AND APPARATUS, ELECTRONIC DEVICE, AND STORAGE MEDIUM

CROSS-REFERENCE TO RELATED APPLICATION

This application is a national stage filing under 35 U.S.C. § 371 of international application number PCT/CN2022/095290, filed May 26, 2022, which claims priority to Chinese patent application No. 202110662694.5 filed Jun. 15, 2021. The contents of these applications are incorporated herein by reference in their entireties.

TECHNICAL FIELD

The present disclosure relates to the technical field of image processing, in particular to a method and device for data processing, an electronic apparatus, and a storage medium.

BACKGROUND

As the era of Internet of Things (IoT) comes, a variety of data are transmitted across different devices. With the increasing maturity of 3D scanning technologies and systems, point cloud data describing the 3D structure of an object is widely employed in surveying and mapping, automobile driving, agriculture, planning and design, archeology and heritage conservation, medical care, gaming and entertainment. Point cloud data has the characteristics of fast acquisition and accuracy, which makes point cloud data especially valued in the field of image processing technology. However, the amount of point cloud data generated after scanning is often more than tens of thousands of bits or even higher, such that the storage and transmission of point cloud data require a lot of resources, and point cloud data compression is needed.

Currently, the common point cloud data compression methods can be divided into Video-based Point Cloud Coding (V-PCC) and Geometry-based Point Cloud Coding (G-PCC). G-PCC is typically employed to convert point cloud data into geometric information and attribute information, and then encode the geometric information and attribute information into code streams. The encoding of attribute information is mainly divided into three categories: transformation-based encoding method, mapping-based encoding method, and prediction-based encoding method. Transformation-based coding method is intended to employ the reconstructed geometric information to design attribute transformation to remove the correlation between attribute information. The mapping-based coding method is mapping-based geometric coding by means of identical projection, the attribute video after recoloring is encoded through video encoding techniques. Prediction-based coding method is intended to employ the existing attribute information to predict the current attribute information and reduce the coding cost of the current attribute information. When the attribute information of point cloud data is encoded according to the prediction-based coding method, the coding performance of attribute coding is low due to the large characteristics of three-dimensional space and video. It is important to provide a technical scheme based on the characteristics of three-dimensional point cloud data currently.

SUMMARY

Provided are a method and a device for data processing, an electronic apparatus, and a storage medium in some embodiments of the present disclosure, which can improve the coding efficiency of three-dimensional point cloud data.

An embodiment of the present disclosure provides a method for data processing, which may include, determining a prediction table corresponding to attribute information of a point cloud; determining, a residual and an index of a predicted value of the attribute information according to the prediction table; and encoding the residual and the index of the predicted value to form a code stream for transmission or storage.

An embodiment of the present disclosure provides a method for data processing, which may include, receiving a code stream, and acquiring a residual and an index of a predicted value from the code stream; determining a prediction table corresponding to the residual and the index of the predicted value; and determining attribute information of a point cloud according to the prediction table, the residual and the index of the predicted value.

An embodiment of the present disclosure provides a device for data processing, which may include, a prediction table module configured to determine a prediction table corresponding to attribute information of a point cloud; a residual determining module configured to determine a residual and an index of a predicted value of the attribute information according to the prediction table; and a data encoding module configured to encode the residual and the index of the predicted value to form a code stream for transmission or storage.

An embodiment of the present disclosure provides a device for data processing, which may include, a code stream receiving module configured to receive a code stream, and acquire a residual and an index of a predicted value from the code stream; a prediction table module configured to determine a prediction table corresponding to the residual and the index of the predicted value; and a data decoding module configured to determine attribute information of a point cloud according to the prediction table, the residual and the index of the predicted value.

An embodiment of the present disclosure provides an electronic apparatus, which may include, at least one processor, and a storage device storing at least one program thereon, which when executed by the processor, causes the processor to carry out the method of any one embodiment of the present disclosure.

An embodiment of the present disclosure provides a computer-readable storage medium storing at least one computer program, which when executed by a processor, causes the processor to carry out the method of any one embodiment of the present disclosure.

In an embodiment of the present disclosure, the prediction table of attribute information of point cloud is determined, the attribute information is processed according to the prediction table to obtain the residual and index of the predicted value. The residual and the index of the predicted value are appended to a code stream for transmission or storage. A prediction table is acquired according to the characteristics of attribute information of the point cloud, and the residual and index of the predicted value are determined according to the prediction table, which can reduce the encoding cost of attribute information of the point cloud and improve the encoding performance of the attribute information.

BRIEF DESCRIPTION OF DRAWINGS

FIG. 1 depicts a flowchart showing a method for data processing according to an embodiment of the present disclosure;

FIG. 2 depicts a flowchart showing a method for data processing according to an embodiment of the present disclosure;

FIG. 3 depicts a flowchart showing a method for data processing according to an embodiment of the present disclosure;

DETAILED DESCRIPTION

Figure 4:
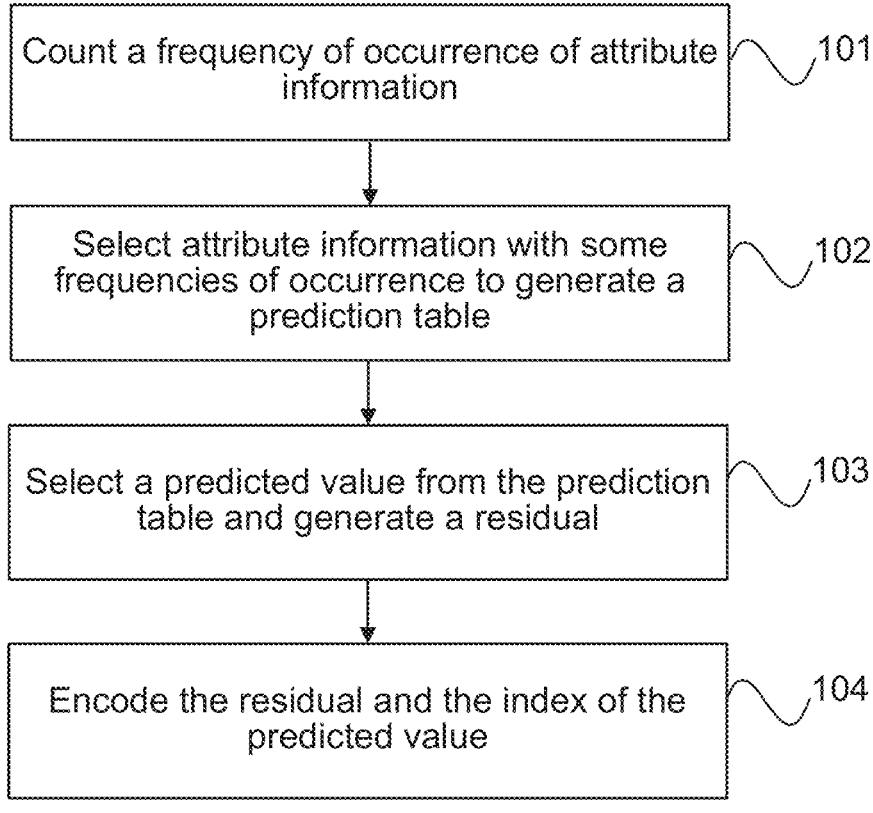
FIG. 4 depicts a schematic diagram showing a method for data processing according to an embodiment of the present disclosure.

It should be understood that the embodiments described here are illustrative but not limiting.

In the following description, the use of suffixes such as "module", "component" or "unit" to represent elements is only for the convenience of the description of the present disclosure, and they do not necessarily have a specific meaning. Therefore, "modules", "components" or "units" can be used in combination.

FIG. 1 depicts a flowchart showing a method for data processing according to an embodiment of the present disclosure. This embodiment can be applied to encode the attribute information of the 3D point cloud. The method can be performed by a device for data processing according to an embodiment of the present disclosure. The device can be implemented as software, hardware, or a combination thereof. Referring to FIG. 1, the method includes the following operations.

At 110, a prediction table corresponding to attribute information of a point cloud is determined.

The point cloud can be composed of a set of discrete points that are irregularly distributed in space and express the spatial structure and surface properties of three-dimensional objects or scenes. In addition to geometric coordinates, points in the point cloud also include some additional attributes, such as color, reflectivity, and so on. These additional attributes can be called attribute information. The attribute information can be different depending upon the method by which the point cloud is collected. The attribute information can include three-dimensional coordinates (XYZ) and laser reflectance in the case that the point cloud is obtained through laser measurement. The attribute information can include three-dimensional coordinates and color information (e.g., RGB) in the case that the point cloud is obtained based on photogrammetry. The attribute information can include three-dimensional coordinates, laser reflectance, and color information in the case that the point cloud is obtained based on laser measurement in combination with photogrammetry. The prediction table can be an information reference table utilized in attribute information compression. The prediction table can include the predicted value of attribute information and the index of predicted value.

In an embodiment of the present disclosure, the attribute information of the point cloud can be extracted, the features of the attribute information can be extracted, and the corresponding prediction table can be obtained by means of the features. In an example, all the attribute information of the point cloud can be extracted, and the value rule of the attribute information can be counted, and the prediction table corresponding to the value rule can be obtained according to the value rule. Also, all the attribute information of the point cloud can be input into a pre-trained neural network model, and the prediction result output by the neural network model can be taken as the prediction table.

At 120, a residual of the attribute information and an index of a predicted value are determined according to the prediction table.

A residual can be the difference between each attribute information and the predicted value in the prediction table. The residual can be intended for encoding and compressing the attribute information. An index of predicted value can identify the unique identification number of each predicted value in the prediction table, and the index of predicted value can be utilized during the encoding of the attribute information.

The attribute information can be compared with the corresponding predicted value in the prediction table, and the difference between the predicted value and the value of the attribute information can be taken as a residual, and the unique identification number of the predicted value can be taken as the index of predicted value.

At 130, the residual and the index of the predicted value are encoded to form a code stream for transmission or storage.

In particular, the code stream can be data formed by encoded and compressed video or image data, and can be sent from a sending end to a receiving end.

In an embodiment of the present disclosure, the residual and the index of predicted value can be compressed and encoded to form a code stream, and the code stream can be sent or stored.

In an embodiment of the present disclosure, the prediction table of attribute information of the point cloud is determined. The attribute information is processed according to the prediction table to obtain the residuals and indices of predicted values. The residuals and indices of predicted values are appended to the code stream. The code stream is sent or stored. The prediction table is obtained according to the feature of attribute information of the point cloud. The residual and index for the predicted value employed for attribute information encoding are determined according to the prediction table, which can reduce the encoding cost of attribute information of the point cloud and improve the encoding performance of the attribute information.

FIG. 2 depicts a flowchart showing a method for data processing according to an embodiment of the present disclosure, which embodies the embodiment described above. Referring to FIG. 2, the method includes the following operations.

At 210, an attribute distribution feature of the point cloud is determined according to a value of each attribute information.

The attribute distribution feature of the point cloud can be the feature that is indicative of the distribution of the values of attribute information in the point cloud. The attribute distribution feature can reflect the distribution feature of the values, and can be determined by means of a neural network or statistical histogram.

In an embodiment of the present disclosure, the values of all attribute information of the point cloud can be collected. Alternatively, the values of part of the attribute information of the point cloud can be collected. The corresponding attribute distribution feature of the point cloud can be analyzed and determined according to the collected values. For example, a statistical histogram of the value of each attribute information can be generated, and the distribution of each value in the statistical histogram can be regarded as the attribute distribution feature of the point cloud.

At 220, a prediction table is generated according to the attribute distribution feature of the point cloud.

The prediction table can be generated according to the attribute distribution feature of the point cloud. For example, corresponding weights can be generated for the values of each attribute information according to the attribute distribution feature of the point cloud, and the values of one or more attribute information can be filled into the prediction table according to the weights, the index of predicted value=is generated for each value. For example, the attribute distribution feature of the point cloud can be input into a pre-trained neural network model, and the predicted values output by the neural network model can form a prediction table.

At 230, a residual and an index of a predicted value of the attribute information are determined according to the prediction table.

At 240, the residual and the index of the predicted value are encoded to form a code stream for transmission or storage.

According to an embodiment of the present disclosure, the attribute distribution feature of the point cloud is determined through the value of each attribute information of the point cloud, the prediction table is generated according to the attribute distribution feature of the point cloud, and the corresponding residual and index of predicted value are determined by processing the attribute information according to the prediction table, so that the coding cost of the point cloud attribute information can be reduced. The coding performance of the attribute information can be improved.

On the basis of the above embodiments, the attribute distribution feature of the point cloud includes at least one of, frequencies of occurrence of attribute values, average of attribute values, or variance of attribute values.

In particular, the frequency of occurrence of an attribute value can represent the total number of observations of a value of attribute information, the average value of attribute values can be the mean value of values of attribute information, and the variance of attribute values can be the variance of values of attribute information.

In some implementations, at least one of, the frequencies of occurrence of attribute values, the average of attribute values, and the variance of attribute values can be counted for each attribute information as the attribute distribution feature of the point cloud.

In an embodiment, the prediction table is generated by means of other statistics. The average of values of attribute information can be taken as statistical characteristics for the generation of the prediction table, such as selecting several values near the average to form a prediction table. The variance of values of attribute information can be taken as the statistical characteristics for the generation of the prediction table, such as sorting the variance of values of attribute information in ascending manner, and selecting the attribute values with few smaller variances from the top to form a prediction table. Different combinations of statistics can be utilized to generate the prediction table.

FIG. 3 depicts a flowchart showing a method for data processing according to an embodiment of the present disclosure, which embodies the embodiment described above. Referring to FIG. 3, the method includes the following operations.

At 310, a frequency of occurrence of at least one attribute value in each type of attribute information of the point cloud is counted, and each frequency of occurrence is taken as an attribute distribution feature of the point cloud.

In an embodiment of the present disclosure, the attribute values of all or part of the attribute information of the point cloud can be extracted, the frequency of occurrence of each attribute value can be counted in each attribute information, and the frequency of occurrence of each attribute value can be taken as the attribute distribution feature of the point cloud.

At 320, all the attribute values in each type of attribute information are sorted by their frequencies of occurrence in a descending manner.

Attribute values can be sorted in a descending manner according to the frequencies of occurrence of the attribute values in each type of attribute information. It can be understood that when multiple types of attribute information are presented, multiple sortings of the attribute values are presented.

At 330, a preset number of attribute values are selected from the top in sorting, and the selected attribute values are filled into the prediction table.

In an embodiment of the present disclosure, the prediction table can be an empty table, which can be configured to store attribute values. The prediction table can store attribute values of various types of attribute information. The upper storage limit of attribute values of each type of attribute information in the prediction table can be a preset number, which can be set by a user. After sorting the attribute values in each type of attribute information, a preset number of attribute values can be selected in each sorting and filled into the prediction table, and a unique identification number can be generated for each attribute value filled into the prediction table as an index of predicted value.

At 340, a residual and an index of a predicted value of attribute information are determined according to the prediction table.

At 350, the residual and the index of the predicted value are encoded to form a code stream for transmission or storage.

According to an embodiment of the present disclosure, the coding cost of point cloud attribute information can be reduced, and the coding performance of attribute information can be improved by, counting the frequencies of occurrence of attribute values in each attribute information, sorting the attribute values in a descending manner based on their frequencies of occurrence, selecting a threshold number of attribute values in the sorting according to an order and filling them into the prediction table, and processing the attribute information according to the prediction table to obtain the residual and the index of predicted value.

On the basis of the above embodiment, generating a prediction table according to the attribute distribution feature of the point cloud may further include the following operation in which, the attribute values in each type of the attribute information are sorted in a descending manner; and a corresponding number of attribute values are selected in the sorting according to the frequencies of occurrence corresponding to the attribute values, and the selected attribute values are filled into the prediction table.

In particular, the attribute values of a type of attribute information can be sorted in a descending manner, and attribute values can be selected according to their frequencies of occurrence, and the selected attribute values are filled into the prediction table. For example, the more the frequency of occurrence of an attribute value is, the more occurrences where the attribute value is filled into the prediction table.

FIG. 4 depicts a schematic diagram showing a method for data processing according to an embodiment of the present disclosure. FIG. 4 shows an embodiment where the frequencies of occurrence of attribute values of the attribute information in the point cloud are counted first, then a prediction table is formed through several attribute information with different frequencies of occurrence. Then a predicted value is looked up in the prediction table for each attribute information in the point cloud, the predicted value is subtracted from the attribute value of the attribute information at the current point to generate a residual. Finally, the index of the predicted value in the prediction table and the residual are encoded. The processing procedure of this embodiment includes the following operations.

At S101, a frequency of occurrence of attribute information is counted.

All of the attribute information of the point cloud is traversed, each attribute information is counted separately, and the frequency of occurrence of each attribute information in the point cloud is counted.

The point cloud refers to a set of data that completely represents the spatial structure or attributes of a three-dimensional object or scene, which can be static point cloud data or dynamic point cloud data at a certain moment. The data includes geometric information and attribute information.

When the attribute information is expressed in the form of an integer, for example, the value range of the component value of the color attribute is 0 to 255, then the frequencies of occurrence of the numbers from 0 to 255 in the attribute information of the point cloud are counted.

When the attribute information is expressed in the form of a floating-point number, the floating-point number can be subjected to a rounding operation first, and then the frequency of occurrence the floating-point number can be counted. The rounding operation can be a rounding-off operation, or an operation in which the decimal part of the floating-point number is removed.

At S102, attribute information with some frequencies of occurrence is selected to generate a prediction table.

In this operation, several values are selected according to a certain rule, from the different attribute information whose frequencies of occurrence are generated at S101 to form a prediction table.

Different pieces of attribute information can be sorted by their frequencies of occurrence in a descending manner, the top N values of higher frequencies can be selected to generate a prediction table.

Alternatively, the attribute information can be segmented into data segments, and M values are selected from each segment to generate a prediction table. For example, for color attributes with values ranging from 0 to 255, 1 value is selected from numbers 0 to 16, 14 values are selected from numbers 17 to 150, and 16 values are selected from numbers 151 to 255, to form a prediction table with these selected values.

The prediction table contains the index numbers and predicted values, and can also contain the frequencies of occurrence of the predicted values.

At S103, a predicted value is selected from the prediction table and a residual is generated.

For each attribute information of the point cloud, a predicted value is selected from the prediction table, and a residual is generated by subtraction of the attribute value and the predicted value of the respective attribute information.

In particular, the rule of the selection can be that the closest predicted value is selected. For example, in the case that the attribute information has only one component, then the value of the current attribute information can be subtracted from each predicted value in the prediction table. The absolute value of the result of each subtraction is taken, and then the smallest value among the absolute values is taken as the predicted value. Alternatively, in the case that the attribute information has multiple components, such as color attributes, the absolute value of the difference of each of the components of the current attribute information and the respective component of each predicted value in the prediction table is taken respectively. For each predicted value, the sum of the absolute value of the difference of each of the components of the current attribute information and the respective component of the predicted value is calculated. And the smallest sum is taken as the predicted value. Alternatively, in the case that the attribute information has multiple components, such as color attribute, only one component (e.g., the luminance component) of the current attribute information is selected. The absolute value of the difference of the selected component of the current attribute information and the respective component of each predicted value in the prediction table is taken respectively. For each predicted value, the sum of the absolute value of the difference between the selected component of the current attribute information and the respective component of the predicted value is calculated. And the smallest sum is taken as the predicted value. Alternatively, in the case that the attribute information has multiple components, such as color attributes, the weighted sum of the components of the current attribute information is calculated according to their weights first. Then, for each predicted value in the prediction table, the weighted sum of the components of the predicted value is calculated. The components of each predicted value and the components of the current attribute information are weighted in the same manner. For each predicted value, the absolute value of the difference of the weighted sum of the components of the current attribute information and the weighted sum of the components of the predicted value is taken respectively. The smallest absolute value of the difference is taken as the predicted value.

In an embodiment, the rule for selection can also be any other rule.

At S104, the residual and the index of the predicted value are encoded.

The operation is to encode the residual and the index of the selected predicted value in the prediction table, that are generated at S103.

The generated residual and predicted value may be encoded with or without other information, such as geometric information, to generate code streams or files.

The encoded data can be generated into a file for storage or a code stream for transmission.

Figure 5:
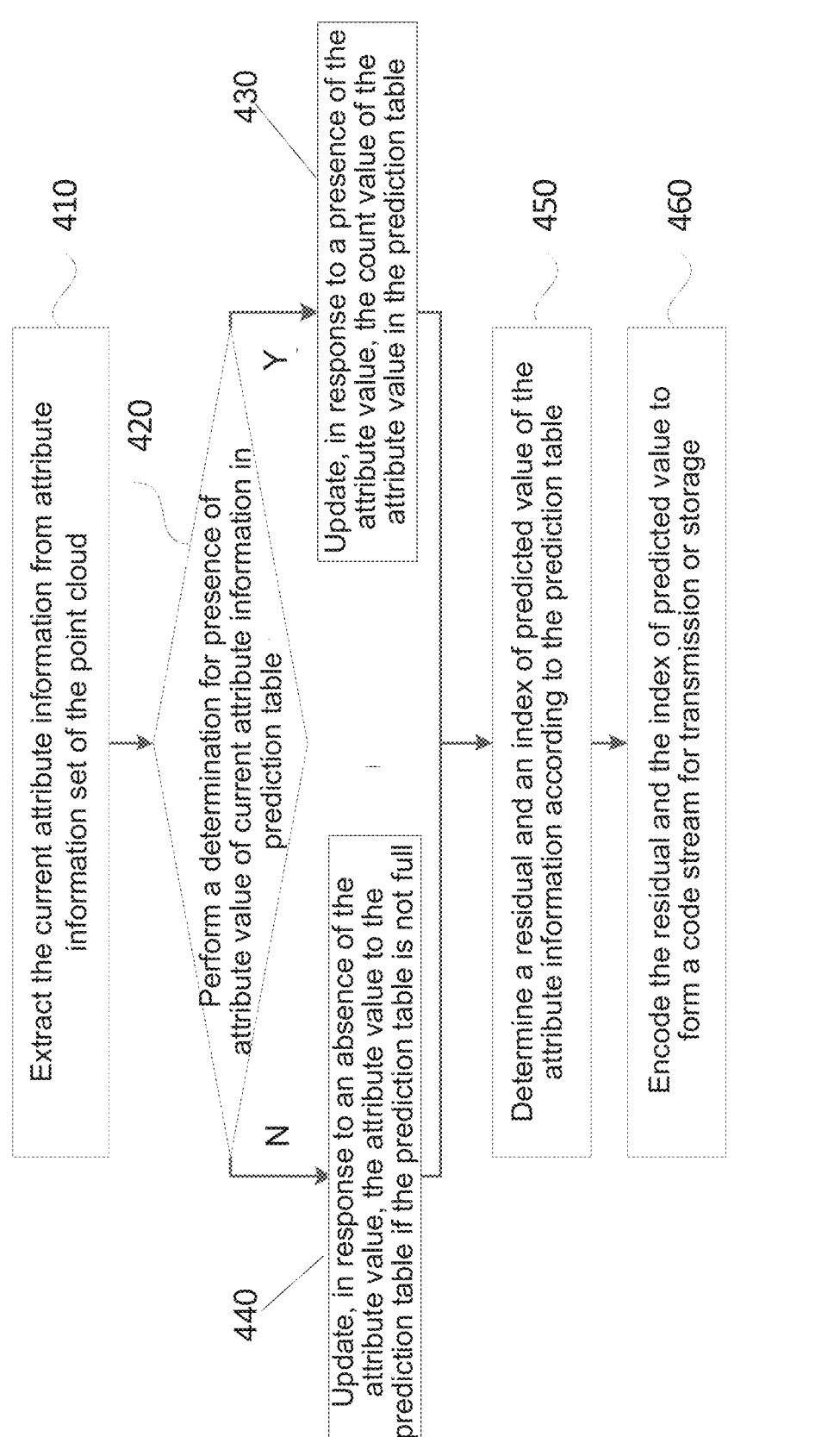
FIG. 5 depicts a flowchart showing a method for data processing according to an embodiment of the present disclosure.

FIG. 5 depicts a flowchart showing a method for data processing according to another embodiment of the present disclosure, which embodies the embodiment described above. Referring to FIG. 5, the method includes the following operations.

At 410, the current attribute information is extracted from a set of attribute information of the point cloud.

In an embodiment of the present disclosure, the encoding of the prediction table and the attribute information can be processed concurrently, and an unprocessed piece of information can be selected from the set of attribute information of the point cloud, as the current attribute information.

At 420, a determination for the presence of the attribute value of the current attribute information in the prediction table, is performed.

This operation is to find out whether the attribute value of the current attribute information is presented in the prediction table.

At 430, in response to a presence of the attribute value, the count value of the attribute value in the prediction table is updated.

The count value can reflect the frequency of occurrence of the predicted value in the prediction table, and the count value can be weighted. For example, the count value can be increased by 2 every time a predicted value appears. The weights of the count values of different attribute information may or may not be identical. In the case that the weights are different, the count value will be increased by 2 if the attribute value of attribute information 1 appears once, and the count value will be increased by 3 if the attribute value of attribute information 2 appears once, for example.

In an embodiment of the present disclosure, when an attribute value of the current attribute information is presented in the prediction table, the count value of the attribute value in the prediction table can be updated. It can be understood that the count value can be updated according to the weighted value of the current attribute information.

At 440, in response to an absence of the attribute value, the attribute value is updated to the prediction table if the prediction table is not full.

In an embodiment of the present disclosure, an upper limit is set to the number of predicted values stored in the prediction table. When the number of predicted values stored in the prediction table reaches the upper limit, it can be considered that the prediction table is full, otherwise, the prediction table is not full. When the attribute value of the current attribute information is not presented in the prediction table and the prediction table is not full, the predicted value can be appended to the prediction table.

At 450, a residual and an index of predicted value of the attribute information are determined according to the prediction table.

At 460, the residual and the index of predicted value are encoded to form a code stream for transmission or storage.

On the basis of the above embodiment, updating the attribute value to the prediction table includes at least one of, updating the attribute value with the highest frequency of occurrence within a threshold time to the prediction table;

updating the attribute value to the prediction table according to the first-in-first-out (FIFO) principle; or
replacing the stored attribute value having the least count value in the prediction table with the current attribute value.

The threshold time can be a period of time in which the attribute values are cached, and can be set by a user.

In an embodiment of the present disclosure, the attribute value can be updated to the prediction table, according to one or more of the following rules. For example, the attribute value with the highest frequency of occurrence within a period of time can be updated to the prediction table. The period of time can be determined by the way that the user sets the length of the threshold time. Alternatively, the predicted value with the longest storage time in the prediction table can be replaced with the attribute value according to the FIFO principle. Alternatively, the attribute value stored in the prediction table can be replaced with the predicted value, and the attribute value is the attribute value with the smallest count value in the prediction table.

Figure 6:
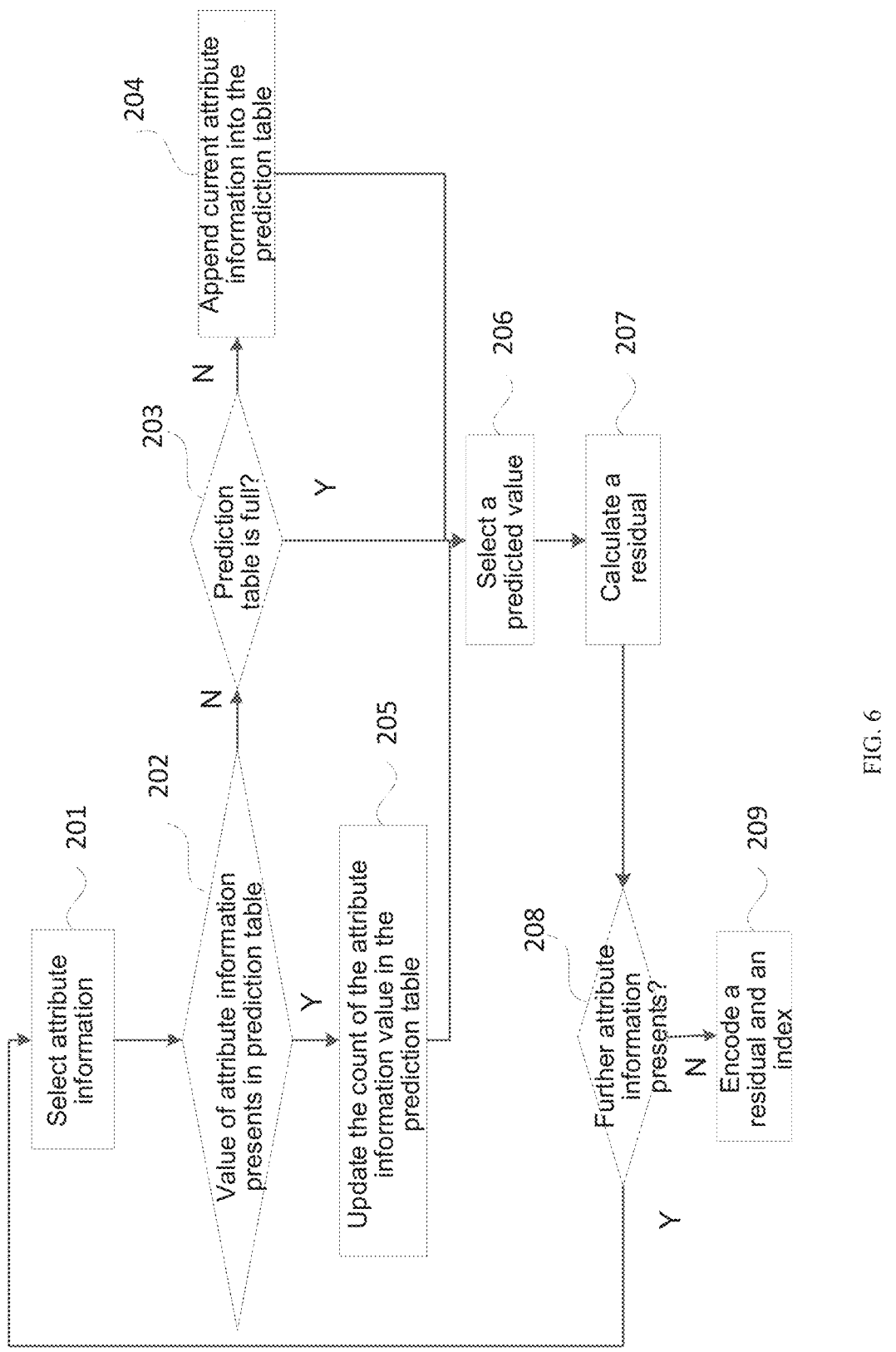
FIG. 6 depicts a schematic diagram showing a method for data processing according to an embodiment of the present disclosure.

In an exemplary embodiment, the prediction table can be dynamically generated while the pieces of attribute information are selected successively, rather than being generated by traversing all the attribute information of the point cloud, thus saving the time for generating the prediction table. FIG. 6 depicts a schematic diagram showing a method for data processing according to an embodiment of the present disclosure. As shown in FIG. 6, the method includes the following operations.

At S201, attribute information is selected.

This operation is to select a point cloud attribute information, in which the attribute information whose residual has been calculated will not be selected.

At S202, a determination for the presence of a value of the attribute information in the prediction table is performed.

This operation is to find out whether the current attribute information is presented in the prediction table, for a dynamical update of the prediction table.

At S203, a determination is performed as to whether the prediction table is full.

The maximum number of predicted values contained in the prediction table is preset. If the current attribute value is not in the prediction table, a determination as to whether the prediction table is full is made according to whether the number of predicted values exceeds the maximum number of predicted values. If the number of predicted values exceeds the maximum number of predicted values, the prediction table is full, otherwise, the prediction table is not full.

At S204, the current attribute information is appended to the prediction table.

The current attribute value is appended to the prediction table, and the count is recorded, in response to a determination that the prediction table is not full at S203.

At S205, the count of the attribute information value is updated in the prediction table.

If it is determined at S202 that the prediction table contains the current attribute information value, the count of this attribute information value in the prediction table is updated.

The update of the count can be done by increasing the count by one, or by different numbers according to the importance of current attribute information. For example, for important attribute information, and the count can be increased by two.

In an embodiment, the prediction table can adopt different updating schemes. For example, the queue principle of first-in first-out is adopted, and the predicted count values at the top of the queue with the most recent occurrences are stored, regardless of the frequencies of occurrences of the prediction values. Alternatively, the frequencies of occurrences of the prediction values can be taken into account as well. In this case, when the full table needs to be updated, a new attribute information value replaces the predicted value with the least count in the table.

At S206, a predicted value is selected.

In this operation, a predicted value is selected from the prediction table. If it is determined at S202 that the current attribute information is the prediction value, the attribute value of the current attribute information can be taken as the prediction value. Otherwise, a predicted value shall be selected from the prediction table. The selection rule is the same as that discussed with respect to operation S103.

At S207, a residual is calculated.

The calculation of the residual here is identical to the calculation of the residual at S103.

At S208, a determination for the presence of further attribute information is performed.

This operation is to determine whether predicted value selection and residual calculation for each attribute information have been done. If the predicted value selection and residual calculation for each attribute information have been done, S209 can be performed, otherwise, S201 can be performed.

At S209, a residual and an index are encoded.

The encoding of the residual and the index is identical to that described with respect to S104. It is also possible to encode the residual and index of the current attribute information after operation S207 is performed, instead of waiting until all the attribute information has been traversed.

On the basis of the above embodiment, determining the prediction table corresponding to the attribute information of the point cloud includes, grouping all attribute information of the point cloud into at least two attribute information groups; and determining a prediction table corresponding to each attribute information group.

In an embodiment of the present disclosure, the point cloud can be divided into a plurality of attribute information groups according to the attribute information of the point cloud, and each attribute information group corresponds to a respective prediction table. For example, the point cloud can be divided into a plurality of attribute information groups according to the types of attribute information, and a corresponding prediction table can be generated for each attribute information group according to the characteristics of the respective attribute information. For another example, the point cloud can be divided into multiple attribute information groups according to the value of the attribute information, and the attribute information with similar variance can be divided into the same attribute information group, and each attribute information group corresponds to a respective prediction table.

On the basis of the above embodiment, grouping all the attribute information of the point cloud into at least two groups of attribute information includes, grouping each attribute information into a corresponding group of attribute information according to the geometric information of the point cloud.

The geometric information can be information reflecting the position relationship of the point cloud in space, including coordinates and relative distances.

In an embodiment of the present disclosure, the attribute information of each point in the cloud can be divided into a plurality of attribute information groups according to the coordinates of each point in the cloud or the relative distance from other points, where the number of divided attribute information groups can be set by a user or determined by the number of categories of the attribute information.

On the basis of the above embodiment, the geometric information includes at least one of, Morton code sorting, Hilbert code sorting, octree blocking or layering of point cloud three-dimensional coordinates, and K-D tree blocking or layering of point cloud three-dimensional coordinates.

In an embodiment, the statistical range of point cloud attribute information can be changed from all data to partial data, and the point cloud attribute information can be sorted according to geometric information first, and then the sorted point cloud attributes are divided into N groups in sequence, and the prediction table of each group can be generated by means of the above-mentioned embodiment. For example, the geometric information can be the sorting according to the Morton code or Hilbert code, then the attribute information is sorted according to the corresponding geometric information, and 512 points are selected as a group. Then, a group of the attribute information of point clouds is counted separately, and the first 32 pieces of attribute information with the higher frequency of occurrence are selected to generate a prediction table. Then, the predicted values are selected for these 512 points respectively to generate residuals, and the residuals and corresponding index values are encoded.

For another example, the geometric information can also be divided into blocks or layers in the form of an octree or K-D tree, and the attribute information of the divided or layered areas is a group. Then, each group of the attribute information of the point clouds is counted separately. The top 16 pieces of attribute information with the higher frequency of occurrence are selected to generate a prediction table. Then, a predicted value is selected for each group of points respectively to generate a residual. The residuals and corresponding index values are encoded.

On the basis of the above embodiment, the prediction table at least includes an attribute value including at least one attribute component value.

In an embodiment of the present disclosure, the prediction table can be composed of attribute values, and each attribute value can have one or more attribute components. For example, an attribute value is a color value, the color of which is in RGB mode, and the attribute components can be color components of different colors in RGB respectively.

In an embodiment, the prediction table may contain an index and a predicted value, where the predicted value may be one component or multiple components.

The prediction table can also contain statistical information, such as the frequency of occurrence of each predicted value, the variance of each predicted value, etc. An organization form of the prediction table is shown in Table 1, in which the sequence number of a predicted value is the index of the predicted value, so it is not necessary to further store the index values separately in the prediction table. However, if the index value is not the sequence number of a predicted value, then the index value shall be appended.

TABLE 1

| Organization of Prediction Table |
| --- |

```
predict_map( ) {
numOfPredictor;
numOfPredictorComponent;
```

TABLE 1-continued

Organization of Prediction Table

```
for(i = 0;  i < numOfPredictor; i++){
    for(i=0;  j < numOfPredictorComponent; j++){
        predictor[i][j] = valueOfPredictor;
    }
}
```

"numOfPredictor" indicates the number of predicted values; "numOfPredictorComponent" indicates the number of components contained in a predicted value, and "valueOfPredictor" indicates a predicted value.

In an embodiment, the prediction table can be placed in the attribute information header or attribute slice header or attribute tile header, or other parameter sets that can indicate the characteristics of attribute information, as shown in Table 2.

TABLE 2

Prediction table set in attribute information header

```
attribute_header( ) {
withColor;
    withRef;
    .......
    if (withColor) {
    ......
        withPredict;
        if (withPredict){
            withPredictMap;
            if (withPredictMap){
                predict_map( );
            }
            ......
        }
    }
    ......
    byte_alignment( )
}
```

In particular, "withPredict" indicates whether to adopt predictive coding, "1" indicates an adoption of predictive coding, and "0" indicates non-adoption of predictive coding; and "withPredictMap" indicates whether a prediction table is included, "1" indicates an inclusion of a prediction table, and "0" indicates an exclusion of a prediction table.

In an embodiment, the prediction table can also adopt other organizational forms, as shown in Table 3.

TABLE 3

Prediction table set in attribute information header

```
attribute_slice_header( ) {
slice_id
    withPredict;
    if (withPredict){
        withPredictMap;
        if (withPredictMap){
            predict_map( );
        }
    }
    byte_alignment( )
}
```

In particular, "withPredict" indicates whether to adopt predictive coding, "1" indicates an adoption of predictive coding, and "0" indicates non-adoption of predictive coding; and "withPredictMap" indicates whether a prediction table is included, "1" indicates an inclusion of a prediction table, and "0" indicates an exclusion of a prediction table.

The prediction table can also take the form of ISO/IEC 14496-12 ISO BMFF. The prediction table can be indicated in the existing Attribute track, and the specific content can be put together with the attribute information. The indication information in Attribute is realized as follows:

```
aligned(8) class GPCCComponentInfoBox
                extends FullBox('ginf', version = 0, 0) {
    unsigned int(8)  gpcc_type;
    if(gpcc_type == 4) {
        ......
        unsigned int(1)    predictor_map_present;
bit(4)            reserved = 0;
    if (predictor_map_present) {
        predict_map( );
    }
    ......
    }
}
```

"gpcc_type" equals 4, that indicates attribute information; "predictor_map_present" equals 1, that indicates a presence of a prediction table, while "predictor_map_present" equals 0, that indicates an absence of a prediction table.

In an embodiment, the indices of the prediction table and residual are presented in the attribute information data, and their reference forms can be shown in Table 4.

TABLE 4

Reference of Index and Residual of Prediction Table

```
attribute_data_color( ) {
    residual_zero_run_length = 0
    for( i = 0;  i < pointCloudNum; i++ ) {
        if (is_residual_equal_zero) {
            residual_zero_run_length++
        } else {
        ......
            if ( force_attribute_based_pred) {
                attr_predict_idx
                attr_predict_residual
            }
            ......
            residual_zero_run_length = 0
        }
    }
    termination_bit_one      /* equals to 1 */
}
```

In particular, "attr_predict_idx" denotes the index value; and "attr_predict_residual" denotes the residual value.

On the basis of the above embodiment, at least one prediction table may be presented.

In an embodiment, a new table is established for an isolated point in the point cloud, where the isolated point can mean that the value of attribute information has a significant difference from all the values in the prediction table, and multiple isolated points can be presented. Alternatively, the isolated points can be combined with the existing prediction tables into one prediction table.

In an embodiment, a prediction table is established for different components of attribute information, such as color attribute RGB space. Colors, Red (R), green (G) and blue (B) all have their own prediction tables, and the color attribute of each point in point cloud data is represented by three index values.

In one embodiment, a prediction table is set in the attribute information header described in the fifth embodiment, and each of the different attribute slice headers has its own prediction table, which can be a supplement to the prediction table of the attribute information header. That is, the prediction table in the attribute slice header and the prediction table of the attribute information header jointly generate a prediction table. Alternatively, the prediction table of the attribute slice header records the difference with the prediction table of the attribute information header. That is, the prediction table in the attribute slice header needs to be added to the prediction table of the attribute information header to generate the final prediction table for the attribute slice header.

On the basis of the above embodiment, if the attribute information includes color attributes, then the prediction table includes a palette, and the attribute component values of the palette are provided with weights.

In an embodiment of the present disclosure, the attribute information is a color attribute, and the color can be in different color spaces, such as luminance chroma (YUV), RGB, or the like. The prediction table based on color attributes may be a palette.

For example, the YUV color space is dominated by the Y component, so the prediction table is dominated by the Y component, and the weight of the Y component is higher than that of the UV components when the statistical characteristics of attribute information are calculated.

For another example, the weights of the three components in RGB color space are identical, so the weights of the three components are identical when the statistical characteristics of attribute information are calculated.

On the basis of the above embodiment, determining the prediction table corresponding to the attribute information of the point cloud includes, generating the prediction table based on a preset neural network, where the neural network is trained and generated by a threshold number of pieces of attribute information of a point cloud in advance, and the attribute information set includes attribute values and prediction values.

Among them, the threshold number of the pieces of the attribute information for training the neural network can be a larger value. The larger the threshold number, the higher the accuracy of the neural network, and the threshold number can be set by a user according to experience.

In an embodiment of the present disclosure, the prediction table can be generated by a neural network that is in turn trained by the attribute information of the point cloud and thus generated. The attribute information for training the neural network can include predicted values and attribute values.

In an example, a neural network can be employed to generate the prediction table. The neural network is trained by means of the existing point cloud data set to obtain the prediction table with the optimal performance. Training can be performed for different types of point clouds to obtain a plurality of prediction tables. For example, a predicted value is specially trained for the reflectivity of the vehicle map.

On the basis of the above embodiment, determining the residual and the index of predicted value of the attribute information according to the prediction table includes, selecting a predicted value and an index of the predicted value in the prediction table according to the attribute value of each attribute information. The difference between the predicted value and the attribute value of the attribute information is taken as the residual.

The predicted value corresponding to the attribute information can be determined in the prediction table, and the difference between the predicted value and the attribute value of the attribute information can be taken as the residual. The process of determining the predicted value of attribute information can include the acquisition of the corresponding predicted value according to the category or value size of attribute information, and the index number of the predicted value stored in the prediction table can be taken as the index of predicted value.

On the basis of the above embodiment, the selection of the predicted value and the index of predicted value in the prediction table according to the attribute value of each attribute information includes the operations in which, the difference and/or weighted difference between the attribute value and each attribute value in the prediction table is taken, the attribute value in the prediction table that corresponds to the difference with the smallest absolute value and/or the smallest absolute weighted difference is taken as the predicted value of the attribute information, and the index of the attribute value in the prediction table is taken as the index of predicted value.

In an embodiment of the present disclosure, one type of attribute information in the prediction table may have a plurality of attribute values, and the difference between the attribute value of the attribute information and each attribute value in the prediction table can be calculated respectively. The attribute value in the prediction table that corresponds to the smallest absolute difference can be taken as the predicted value, and the index of the predicted value can be taken as the index of predicted value. It can be understood that each attribute value in the prediction table can also have its own weight, and the weighted difference of each difference value can be determined according to the weight. The attribute value in the prediction table that corresponds to the smallest absolute weighted difference can be taken as the predicted value, and the index of the predicted value can be taken as the index of predicted value.

Figure 7:
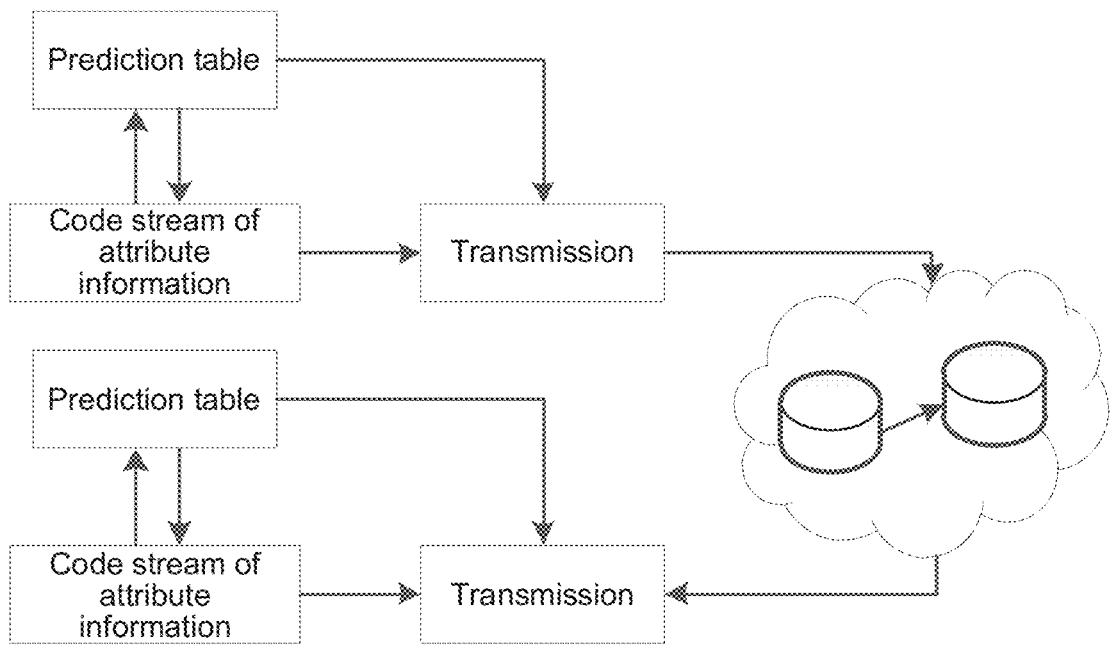
FIG. 7 depicts a schematic diagram showing transmission of a prediction table according to an embodiment of the present disclosure.

On the basis of the above embodiment, the prediction table can be encoded along with the attribute information and transmitted in the code stream, or the prediction table can be transmitted separately. The prediction table can be sent to the decoding end when the coding end and the decoding end establish a link, and the prediction table can be updated during the interaction. FIG. 7 depicts a schematic diagram showing transmission of a prediction table according to an embodiment of the present disclosure. Refer to FIG. 7, the prediction table can be stored on a server in advance, and the coding end only sends the serial number of the prediction table, and the decoding end sends the serial number of the prediction table to the server according to the requirements, and requests the server to issue the prediction table.

The prediction table can also be stored or transmitted without being encoded.

For lossless compression, the prediction table can be dynamically generated in the decoding process at the decoding end, and the prediction table generated in the decoding process at the decoding end is completely consistent with the prediction table generated in the encoding process at the encoding end, so the prediction table does not need to be encoded, stored or transmitted at the encoding end.

Figure 8:
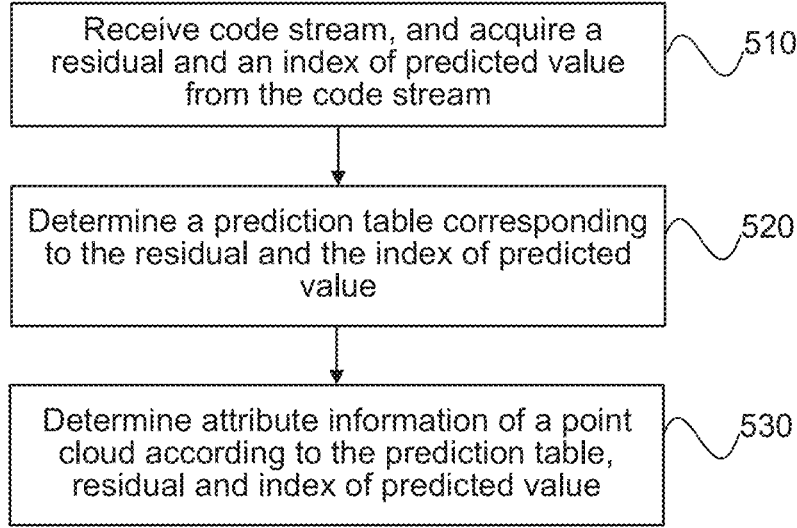
FIG. 8 depicts a flowchart showing a method for data processing according to an embodiment of the present disclosure.

FIG. 8 depicts a flowchart showing a method for data processing according to an embodiment of the present disclosure. This embodiment can be applied to decode the attribute information of the 3D point cloud. The method can be performed by a device for data processing according to an embodiment of the present disclosure. The device can be implemented as software, hardware, or a combination thereof. Referring to FIG. 8, the method includes the following operations.

At 510, a code stream is received, and a residual and an index of predicted value are acquired from the code stream.

In an embodiment of the present disclosure, after receiving the code stream, the residual and the index of predicted value can be parsed from the code stream.

At 520, a prediction table corresponding to the residual and the index of the predicted value is determined.

The prediction table is an information table of prediction values for decoding, which can be obtained from the attribute information header or attribute slice header or attribute tile header, or other parameter sets that can indicate the characteristics of attribute information or can be dynamically generated according to the residual and index of predicted value in the code stream. One or more prediction tables can be presented.

At 530, attribute information of a point cloud is determined according to the prediction table, residual and index of the predicted value.

In an embodiment of the present disclosure, the corresponding predicted value can be found in the prediction table according to the index of predicted value=, and the value of the attribute information of the point cloud can be determined according to the residual value and the predicted value. For example, the sum of the residual value and the predicted value can be taken as the attribute value of the attribute information of the point cloud.

In an embodiment of the present disclosure, the attribute information of the point cloud is determined according to the prediction table, the residual, and the index of predicted value by receiving the code stream and obtaining the prediction table, the residual, and the index of predicted value from the code stream.

In an embodiment of the present disclosure, the attribute information of the point cloud is determined according to the prediction table, the residual, and the index of the predicted value by receiving the code stream and obtaining the residual and the index of the predicted value from the code stream, and dynamically generating the prediction table according to the residual and the index of the predicted value. As such, fast decoding of attribute information of the point cloud is achieved, and the transmission efficiency of the point cloud is enhanced.

Figure 9:
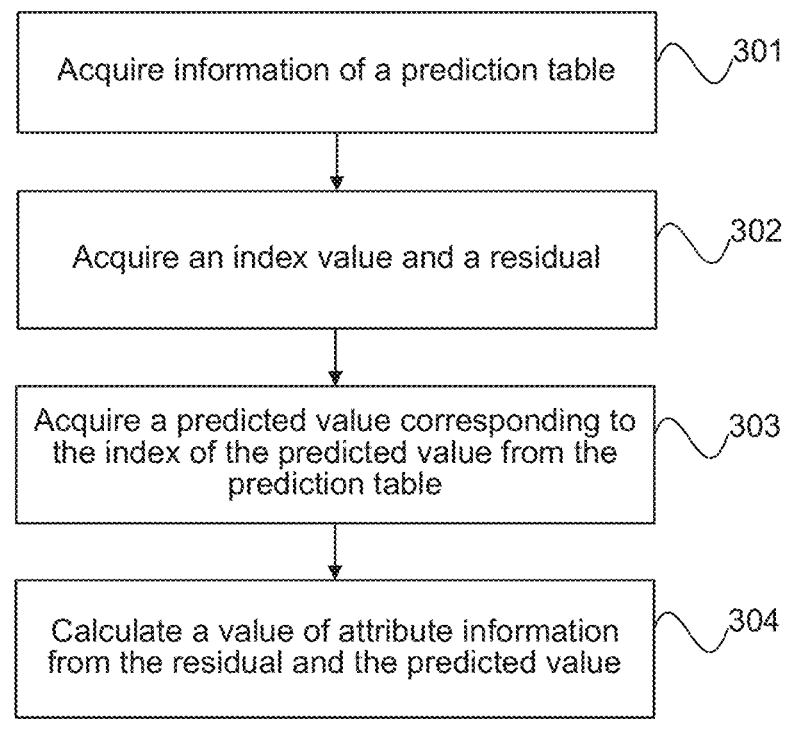
FIG. 9 depicts a schematic diagram showing a method for data processing according to an embodiment of the present disclosure.

FIG. 9 depicts a schematic diagram showing a method for data processing according to an embodiment of the present disclosure. Referring to FIG. 9, information of a prediction table is obtained from a code stream or a file first, then index information and residual are obtained from the code stream or the file, and a corresponding predicted value is looked up in the prediction table according to the index information, and finally an attribute information value is calculated from the predicted value and the residual. The method includes the following operations.

At S301, information on a prediction table is acquired.

In this operation, information on the prediction table is acquired from a code stream or a file containing coded data of a point cloud. The information of the prediction table can exist in an attribute information header, an attribute slice header, an attribute tile header, other parameter sets that can indicate the characteristics of the attribute information or the transport layer media description unit. In the case that the prediction table is dynamically generated at the decoding end, this operation may be omitted.

At S302, an index value and a residual are acquired.

In this operation, an index of the predicted value and a residual are acquired from the code stream or file containing coded data of the point cloud.

At S303, a predicted value corresponding to the index of the predicted value is acquired from the prediction table.

In this operation, the corresponding predicted value is looked up in the prediction table obtained at S301, according to the index of the predicted value obtained at S302.

At S304, a value of attribute information is calculated from the residual and the predicted value.

In this operation, the residual obtained at S302 and the predicted value obtained at S303 are added, to generate the attribute information value.

Figure 10:
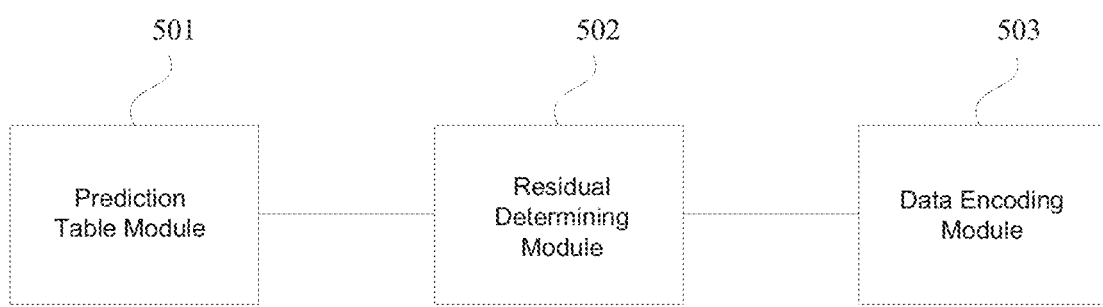
FIG. 10 depicts a schematic diagram showing a device for data processing according to an embodiment of the present disclosure.

FIG. 10 depicts a schematic diagram showing a device for data processing according to an embodiment of the present disclosure. The device can perform the method for data processing according to any one of the embodiments of the present disclosure and has corresponding functional modules and beneficial effects. The device can be implemented as software, hardware, or a combination thereof, and includes a prediction table module 501, a residual determining module 502, and a data encoding module 503.

The prediction table module 501 is configured to determine a prediction table corresponding to the attribute information of a point cloud.

The residual determining module 502 is configured to determine a residual and an index of a predicted value of the attribute information according to the prediction table.

The data encoding module 503 is configured to encode the residual and the index of the predicted value to form a code stream for transmission or storage.

In an embodiment of the present disclosure, the prediction table of attribute information of point cloud is determined by the prediction table module, the residual determining module processes the attribute information according to the prediction table to obtain the residual and index of the predicted value. As such, the prediction table is acquired according to the characteristics of attribute information of the point cloud, and the residual and index for predicted value employed for attribute information encoding are determined according to the prediction table, which can reduce the encoding cost of attribute information of the point cloud and improve the encoding performance of the attribute information.

On the basis of the above embodiment, the prediction table module 501 includes, a distribution feature unit, which is configured to determine the attribute distribution feature of the point cloud according to a value of the attribute information; and a table generating unit, which is configured to generate a prediction table according to the attribute distribution feature of the point cloud.

On the basis of the above embodiment, the distribution feature unit includes, a frequency counting subunit, which is configured to count a frequency of occurrence of at least one attribute value in each type of attribute information of the point cloud, and to take the frequency of occurrence of at least one attribute value in each type of attribute information of the point cloud, as an attribute distribution feature of the point cloud.

On the basis of the above embodiments, the attribute distribution feature of the point cloud in the distribution feature unit includes at least one of, the frequencies of occurrence of attribute values, average of attribute values, or variance of attribute values.

On the basis of the above embodiment, the table generating unit is configured to, sort each attribute value in a descending manner according to the frequency of occurrence of the attribute value in each type of attribute information; and select a preset number of attribute values from the top in the sorting, and fill the selected attribute values into the prediction table.

On the basis of the above-mentioned embodiment, the table generating unit is further configured to sort the attribute values in each type of attribute information in a descending manner; and select a corresponding number of attribute values in the sorting according to the frequencies of occurrence corresponding to the attribute values, and fill the selected attribute values into the prediction table.

On the basis of the above embodiment, the prediction table module 501 further includes, an information extracting unit, which is configured to extract current attribute information from the attribute information set of the point cloud;

an information determining unit, which is configured to perform a determination for the presence of the attribute value of the current attribute information in the prediction table; and an information processing unit, which is configured to update the count of the attribute value in the prediction table in response to a presence of the attribute value of the current attribute information in the prediction table; and to update the attribute value to the prediction table in response to in response to both an absence of the attribute value of the current attribute information in the prediction table and a determination that the prediction table is not full.

On the basis of the above embodiment, updating the attribute value to the prediction table by the information processing unit, includes at least one of, updating the attribute value with the highest frequency of occurrence within a threshold time to the prediction table;

updating the attribute value to the prediction table according to the first-in-first-out (FIFO) principle; or replacing the stored attribute value having the least count value in the prediction table with the current attribute value.

On the basis of the above embodiment, the prediction table module 501 further includes, a grouping unit, which is configured to group all the attribute information of the point cloud into at least two groups of attribute information; and a table generating unit, which is configured to determine a prediction table corresponding to each attribute information group. On the basis of the above embodiment, the grouping unit is further configured to group each attribute information into a corresponding group of attribute information according to the geometric information of the point cloud.

On the basis of the above embodiment, the geometric information includes at least one of, Morton code sorting, Hilbert code sorting, octree blocking or layering of point cloud three-dimensional coordinates, or K-D tree blocking or layering of point cloud three-dimensional coordinates.

On the basis of the above embodiment, the prediction table at least includes an attribute value including at least one attribute component value.

On the basis of the above embodiment, if the attribute information includes color attributes, then the prediction table includes a palette, and the attribute component values of the palette are provided with weights.

On the basis of the above embodiment, determining the prediction table corresponding to the attribute information of the point cloud includes, generating the prediction table based on a preset neural network, where the neural network is trained and generated by a threshold number of pieces of attribute information of a point cloud in advance, and the attribute information includes attribute values and prediction values.

On the basis of the above embodiment, the residual determining module 502 includes, a table difference unit, which is configured to select a predicted value and an index of the predicted value in the prediction table according to the attribute value of each attribute information; and a residual processing unit, which is configured to take the difference between the predicted value and the attribute value of the attribute information as the residual.

On the basis of the above embodiment, the residual processing unit is configured to: take the difference and/or weighted difference between the attribute value and each attribute value in the prediction table, take the attribute value in the prediction table that corresponds to the difference with the smallest absolute value and/or the smallest absolute weighted difference as the predicted value of the attribute information, and take the index of the attribute value in the prediction table as the index of predicted value.

Figure 11:
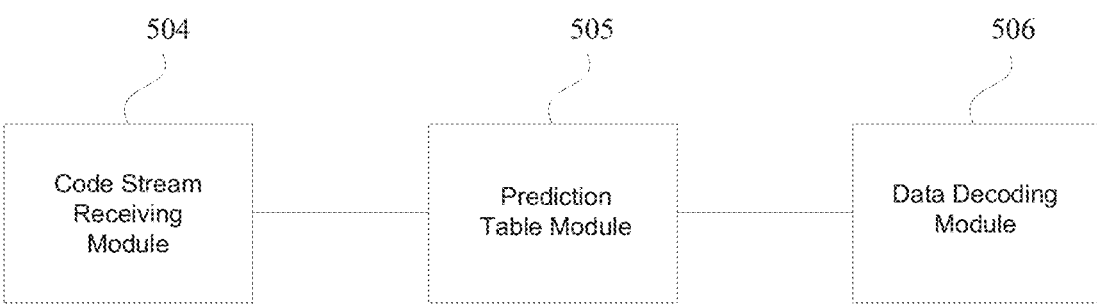
FIG. 11 depicts a schematic diagram showing a device for data processing according to an embodiment of the present disclosure.

FIG. 11 depicts a schematic diagram showing a device for data processing according to an embodiment of the present disclosure. The device can perform the method for data processing according to any one of the embodiments of the present disclosure and has corresponding functional modules and beneficial effects. The device can be implemented as software, hardware, or a combination thereof, and includes a code stream receiving module 504, a prediction table module 505, and a data decoding module 506.

The code stream receiving module 504 is configured to receive a code stream and acquire a residual and an index of predicted value from the code stream.

The prediction table module 505 is configured to determine a prediction table corresponding to the residual and the index of predicted value.

The data decoding module 506 is configured to determine attribute information of a point cloud according to the prediction table, residual and index of predicted value.

According to an embodiment of the present disclosure, a code stream is received by the code stream receiving module, and a residual and an index of a predicted value are acquired from the code stream. The prediction table module obtains the prediction table according to the residual and the index of the predicted value. The data decoding module determines the attribute information of the point cloud according to the prediction table, the residual and the index of the predicted value. Thereby, the rapid decoding of the attribute information of the point cloud is achieved, and the transmission efficiency of the point cloud can be enhanced.

Figure 12:
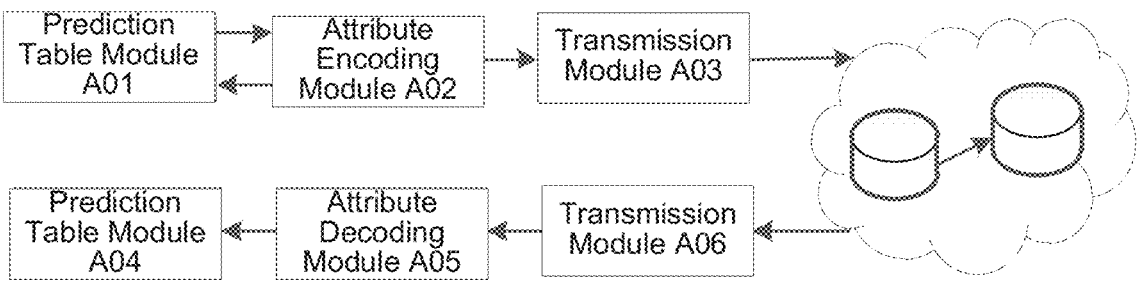
FIG. 12 depicts a schematic diagram showing a device for data processing according to an embodiment of the present disclosure.

FIG. 12 depicts a schematic diagram showing a device for data processing according to an embodiment of the present disclosure. The device includes the following, a prediction table module A01, which is configured to generate a prediction table;

an attribute encoding module A02, which is configured to generate residual information, and encode the residual information and index;

a transmission module A03, which is configured to transmit the encoded data of the attribute, and can also configured to encode and transmit the prediction table;

a prediction table module A04, which is configured to establish or dynamically generate a prediction table;

an attribute decoding module A05, which is configured to decode attribute information, including residual information and index; and a transmission module A06, which is configured to transmit the compressed data of the attribute information, and can also configured to decode the prediction table.

Figure 13:
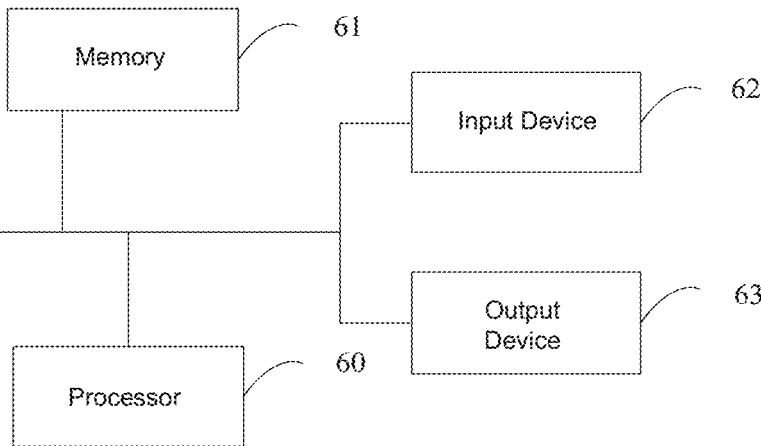
FIG. 13 depicts a schematic diagram showing an electronic apparatus according to an embodiment of the present disclosure.

FIG. 13 depicts a schematic diagram showing an electrical apparatus according to an embodiment of the present disclosure. As shown in FIG. 13, the electrical apparatus includes a processor 60, a memory 61, an input device 62, and an output device 63. Although one processor 60 is shown by way of an example in FIG. 13, more processors can be provided. The processor 60, the memory 61, the input device 62, and the output device 63 in the electrical apparatus can be connected by a bus or other means. FIG. 13 shows the connection implemented as a bus by way of an example.

As a computer-readable storage medium, the memory 61 can be configured to store software programs, computer-executable programs and modules, such as modules corresponding to the device for data processing in an embodiment of the present disclosure (i.e., prediction table module 501, residual determining module 502, and data encoding module 503, or code stream receiving module 504, prediction table module 505, and data decoding module 506). The software programs, instructions and modules stored in the memory 61, when executed by the processor 60, cause the processor 60 to perform various functional applications and data processing of the electronic apparatus, to carry out any one of the above-mentioned methods for data processing.

The memory 61 may generally include a program storage section and a data storage section, in which the program storage section may store an operating system and application programs for performing at least one operation, and data storage section may store data created according to the operation of electronic apparatus, or the like. In addition, the memory 61 can include high-speed random access memory and nonvolatile memory, such as at least one disk memory device, a flash memory device, or other nonvolatile solid-state memory devices. In some implementations, the memory 61 may further include memories remotely located relative to the processor 60, and these remote memories may be connected to the apparatus through a network. Examples of the above networks include, but are not limited to, the Internet, intranet, local area network, mobile communication network, and combinations thereof.

The input device 62 may be configured to receive input numeric or character information and generate key-pressing signal input related to user settings and function control of the electronic apparatus. The output device 63 may include a display device such as a screen.

An embodiment of the present disclosure further provides a storage medium containing computer-executable instructions, which, when executed by a computer processor, causes the processor to carry out a method for data processing, the method includes, determining a prediction table corresponding to attribute information of a point cloud;

determining, a residual and an index of predicted value of the attribute information according to the prediction table; and encoding the residual and the index of predicted value to form a code stream for transmission or storage.

From the description of the above embodiments, it is apparent to a person having ordinary skills in the art that the method of the above embodiments can be implemented by means of software with necessary general hardware, or by hardware, of course, but in many cases, the former is the better practice. Based on this understanding, the technical scheme or the part that contributes to the prior art of the present disclosure can be embodied in the form of software products, which can be stored in a computer-readable storage medium such as floppy disk, Read-Only Memory (ROM), Random Access Memory (RAM), FLASH memory, hard disk or optical disk of a computer, etc., including several instructions to cause a computer device (which can be a personal computer, a server, or a network device, etc.) to carry out the methods described in various embodiments of the present disclosure.

It is worth noting that in the above embodiment of the device for selecting participants, each unit and module included is only divided according to the functional logic, but it is not limited to the above division, as long as the corresponding functions can be realized. Besides, the specific names of each functional unit are only for the purpose of distinguishing them from each other and are not intended to limit the scope of protection of the present disclosure.

It shall be appreciated by a person having ordinary skills in the art that all or some of the steps, functional modules/units in the methods, systems and devices disclosed above can be implemented as software, firmware, hardware and their appropriate combinations.

In the hardware implementation, the division between functional modules/units mentioned in the above description does not necessarily correspond to the division of physical components. For example, a physical component may have multiple functions, or a function or step may be performed by several physical components in cooperation. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be configured to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Several embodiments of the embodiments of the present disclosure are illustrated above in conjunction with the drawings, and the present disclosure is not limited thereto. Any modifications, equivalents, alternations, or improvements, made within the scope of the present disclosure shall be included in the scope of the present disclosure.

What is claimed is:

1. A method for data processing, comprising, determining a prediction table corresponding to attribute information of a point cloud;

determining, a residual and an index of a predicted value of the attribute information according to the prediction table; and encoding the residual and the index of the predicted value to form a code stream for transmission or storage;

wherein the attribute information comprises a plurality of attribute information components of three-dimensional coordinates and laser reflectance in case where the point cloud is obtained through laser measurement; or the attribute information comprises a plurality of attribute information components of three-dimensional coordinates and color information in case where the point cloud is obtained based on photogrammetry; or the attribute information comprises a plurality of attribute information components of three-dimensional coordinates, laser reflectance, and color information in case where the point cloud is obtained based on laser measurement in combination with photogrammetry; and the prediction table comprises the predicted value of the attribute information and an index of the predicted value.

2. The method as claimed in claim 1, wherein the attribute information comprises a plurality pieces of attribute information, and determining the prediction table corresponding to the attribute information of the point cloud comprises, determining an attribute distribution feature of the point cloud according to a value of each of the plurality pieces of attribute information; and generating the prediction table according to the attribute distribution feature of the point cloud.

3. The method as claimed in claim 2, wherein determining the attribute distribution feature of the point cloud according to the value of each of the plurality pieces of attribute information comprises, counting a frequency of occurrence of at least one attribute value in each of the plurality pieces of attribute information of the point cloud, and taking the frequency of occurrence of the at least one attribute value in each of the plurality pieces of attribute information of the point cloud, as the attribute distribution feature of the point cloud.

4. The method as claimed in claim 3, wherein each of the plurality pieces of attribute information comprises at least one attribute value; and generating the prediction table according to the attribute distribution feature of the point cloud comprises, performing a sorting to the at least one attribute value in each of the plurality pieces of attribute information by frequencies of occurrence of the at least one attribute value in a descending manner; and selecting a preset number of attribute values from the at least one attribute value, from the top in the sorting, and filling the selected attribute values into the prediction table.

5. The method as claimed in claim 3, wherein each of the plurality pieces of attribute information comprises at least one attribute value; and generating the prediction table according to the attribute distribution feature of the point cloud comprises, performing a sorting to the at least one attribute value in each of the plurality pieces of attribute information by value of the at least one attribute value in a descending manner; and selecting a corresponding number of attribute values from the at least one attribute value in the sorting according to frequency of occurrence corresponding to the at least one attribute value, and filling the selected attribute values into the prediction table.

6. The method as claimed in claim 2, wherein the attribute distribution feature of the point cloud comprises at least one of, frequency of occurrence of attribute value, average of attribute value, or variance of attribute value.

7. The method as claimed in claim 1, wherein determining the prediction table corresponding to the attribute information of the point cloud comprises, extracting current attribute information from a set of attribute information of the point cloud;

performing a determination for a presence of an attribute value of the current attribute information in the prediction table; and in response to a presence of the attribute value in the prediction table, updating the count value of the attribute value in the prediction table; and in response to both an absence of the attribute value in the prediction table and a determination that the prediction table is not full, updating the attribute value to the prediction table.

8. The method as claimed in claim 7, wherein updating the attribute value to the prediction table comprises at least one of, updating the attribute value having the highest frequency of occurrence within a preset time to the prediction table;

updating the attribute value to the prediction table according to first-in first-out (FIFO) principle; or replacing the stored attribute value having the least count value in the prediction table with the current attribute value.

9. The method as claimed in claim 1, wherein determining the prediction table corresponding to the attribute information of the point cloud comprises, grouping all the attribute information of the point cloud into at least two groups of attribute information; and determining a prediction table corresponding to each group of attribute information.

10. The method as claimed in claim 9, wherein grouping all the attribute information of the point cloud into at least two groups of attribute information comprises, grouping each attribute information into a corresponding group of attribute information according to geometric information of the point cloud.

11. The method as claimed in claim 10, wherein, the geometric information comprises at least one of, Morton code sorting, Hilbert code sorting, octree blocking or layering of point cloud three-dimensional coordinates, or K-D tree blocking or layering of point cloud three-dimensional coordinates.

12. The method as claimed in claim 1, wherein, the prediction table at least comprises an attribute value comprising at least one attribute component value.

13. The method as claimed in claim 1, wherein at least one of the prediction table is provided.

14. The method as claimed in claim 1, wherein the attribute information comprises a color attribute, and the prediction table comprises a palette, and each attribute component value of the palette is provided with a weight.

15. The method as claimed in claim 1, wherein determining the prediction table corresponding to the attribute information of the point cloud comprises, generating the prediction table based on a preset neural network, wherein the neural network is trained and generated by a preset number of pieces of attribute information of the point cloud in advance, and each of the preset number of pieces of attribute information comprises an attribute value and a predicted value.

16. The method as claimed in claim 1, wherein the attribute information comprises a plurality pieces of attribute information, and determining the residual and the index of the predicted value of the attribute information according to the prediction table comprises, for each of the plurality pieces of attribute information:

selecting a predicted value and an index of the predicted value in the prediction table according to the attribute value of the respective attribute information; and taking a difference between the predicted value and the attribute value of the attribute information as the residual of the respective attribute information.

17. The method as claimed in claim 16, wherein selecting the predicted value and the index of the predicted value in the prediction table according to the attribute value of the respective attribute information comprises, taking at least one of, a difference, or a weighted difference, between the attribute value of the respective attribute information and each attribute value in the prediction table, taking the attribute value in the prediction table that corresponds to the difference having the smallest absolute value and/or the smallest absolute weighted difference as the predicted value of the respective attribute information, and taking the index of the taken attribute value in the prediction table as the index of the predicted value.

18. A method for data processing, comprising, receiving a code stream, and acquiring a residual and an index of a predicted value from the code stream;

determining a prediction table corresponding to the residual and the index of the predicted value; and determining attribute information of a point cloud according to the prediction table, the residual and the index of the predicted value;

wherein the attribute information comprises a plurality of attribute information components of three-dimensional coordinates and laser reflectance in case where the point cloud is obtained through laser measurement; or the attribute information comprises a plurality of attribute information components of three-dimensional coordinates and color information in case where the point cloud is obtained based on photogrammetry; or the attribute information comprises a plurality of attribute information components of three-dimensional coordinates, laser reflectance, and color information in case where the point cloud is obtained based on laser measurement in combination with photogrammetry; and the prediction table comprises the predicted value of the attribute information and an index of the predicted value.

19. An electronic apparatus, comprising:

at least one processor; and a memory for storing at least one program which, when executed by the at least one processor, causes the at least one processor to carry out a method for data processing, comprising, determining a prediction table corresponding to attribute information of a point cloud;

determining, a residual and an index of a predicted value of the attribute information according to the prediction table; and encoding the residual and the index of the predicted value to form a code stream for transmission or storage;

wherein the attribute information comprises a plurality of attribute information components of three-dimensional coordinates and laser reflectance in case where the point cloud is obtained through laser measurement; or the attribute information comprises a plurality of attribute information components of three-dimensional coordinates and color information in case where the point cloud is obtained based on photogrammetry; or the attribute information comprises a plurality of attribute information components of three-dimensional coordinates, laser reflectance, and color information in case where the point cloud is obtained based on laser measurement in combination with photogrammetry; and the prediction table comprises the predicted value of the attribute information and an index of the predicted value.

20. A non-transitory computer-readable storage medium storing at least one computer program which, when executed by a processor, causes the processor to carry out the method as claimed in claim 1.

* * * * *